US007651576B2

(12) United States Patent
Minehara et al.

(10) Patent No.: US 7,651,576 B2
(45) Date of Patent: Jan. 26, 2010

(54) METHOD OF AN ULTRA-SHORT FEMTOSECOND PULSE AND KW CLASS HIGH AVERAGE-POWER LASER FOR PREVENTING COLD-WORKED STRESS CORROSION CRACKING IN IRON STEELS AND ALLOYED STEELS INCLUDING STAINLESS STEELS

(75) Inventors: Eisuke Minehara, Soraku-gun (JP); Akihiko Nishimura, Soraku-gun (JP); Takashi Tsukada, Soraku-gun (JP)

(73) Assignee: Japan Atomic Energy Research Institute, Kashiwa (JP)

( * ) Notice: Subject to any disclaimer, the term of this patent is extended or adjusted under 35 U.S.C. 154(b) by 246 days.

(21) Appl. No.: 11/214,044

(22) Filed: Aug. 30, 2005

(65) Prior Publication Data
US 2006/0048867 A1 Mar. 9, 2006

(30) Foreign Application Priority Data
Aug. 30, 2004 (JP) ............................. 2004-249853

(51) Int. Cl.
*B23K 26/16* (2006.01)
*B23K 26/36* (2006.01)
(52) U.S. Cl. ............... 148/565; 219/121.84; 219/121.85
(58) Field of Classification Search ................. 148/565, 148/DIG. 93; 372/2, 21, 22, 30; 359/341.1; 219/121.6–121.86
See application file for complete search history.

(56) References Cited

U.S. PATENT DOCUMENTS

| 4,121,085 | A | * | 10/1978 | Diemer et al. ......... 219/121.84 |
| 5,336,998 | A | * | 8/1994 | Watts et al. .................. 324/235 |
| 5,736,709 | A | * | 4/1998 | Neiheisel ............... 219/121.61 |
| 6,156,030 | A | * | 12/2000 | Neev ........................... 606/10 |
| 6,713,716 | B1 | * | 3/2004 | Lawrence et al. ...... 219/121.68 |
| 6,878,900 | B2 | * | 4/2005 | Corkum et al. ......... 219/121.69 |
| 2003/0057192 | A1 | * | 3/2003 | Patel ..................... 219/121.69 |
| 2003/0127441 | A1 | * | 7/2003 | Haight et al. .......... 219/121.84 |

OTHER PUBLICATIONS

E. Minehara, A. Nishimura, and T. Tsukada, Femtosecond FEL Prevention for Cold-Worked SCC Failures of Nuclear Reactors, Proceedings of the 1st Annual Meeting of Particle Accelerator Society of Japan and the 29th Linear Accelerator Meeting in Japan, Aug. 4-6, 2004.*

(Continued)

*Primary Examiner*—George Wyszomierski
*Assistant Examiner*—Mark L Shevin

(57) ABSTRACT

The method of preventing cold-worked stress corrosion cracking in the iron steels and alloyed steels including stainless steels comprises removing a residual tensile stressed layer, optionally generating residual compression, through the impact of irradiation with the ultra-short femtosecond pulse and kW class high average-power laser, and removing a hardened surface layer extremely susceptible to stress corrosion cracking, whereby this susceptible hardened surface layer with many concentrated dislocation defects and the likes is removed without generating or introducing any of such hardened layer in the process of its removal. The method is free from the risk of damaging other equipment by peening with steel balls or other shaped shots, is almost unlimited in actual environment, effectiveness, work, place and other conditions for application, is inexpensive, and functions continuously for a much longer period than an ordinary nuclear reactor's service lifetimes.

1 Claim, 2 Drawing Sheets

OTHER PUBLICATIONS

M. Obata et al, Effect of laser peening on residual stress and stress corrosion cracking for type 304 stainless steel, 7th International Conference on Shot Peening, (1997), p. 387-394.*

A. Nishimura et al, Ablation of work hardening layers against stress corrosion cracking of stainless steel by repetitive femtosecond laser pulses, Fifth International Symposium on Laser Precision Microfabrication, edited by I. Miyamoto et al, Proc. of SPIE vol. 5662 (2004).*

E.J. Minehara et al, Preparation femtosecond laser prevention for the cold-worked stress corrosion cracking on reactor grade low carbon stainless steel, Proceedings of the 2004 FEL Conference,p. 665-666.*

Y. Sano et al, Process and application of shock compression by nano-second pulses of frequency-doubled Nd:YAG laser, In High Powered Lasers In Manufacturing, X. Chen (editor) et al, Proceedings of SPIE vol. 3888 (2000), p. 294-306.*

E.J. Minehara. Thermal and non-thermal laser cutting utilizing advanced industrial lasers and ERL-FELS). Proceedings of FEL 2007, Novosibirsk, Russia. p. 175-178.*

Advance mailing of The 5th Internation Symposium on Laser Precision Microfabrication, (May 11th -14th, 2004). (p. 1 and 2).*

E. Minehara et al, Femtosecond FEL Prevention for Cold-Worked SCC Failures of Nuclear Reactors, Proceedings of the 1st Annual Meeting of Particle Accelerator Society of Japan and the 29th Linear Accelerator Meeting in Japan, Aug. 4-6, 2004, Funabashi, Japan, p. 655.*

M. Obata et al. Effect of laser peening on residual stress and stress corrosion cracking for type 304 stainless steel, 7th International Conference on Shot Peening, (1997), p. 387-394.*

P. Mannion et al, Ablation thresholds in ultrafast laser micro-machining of common metals in air, Opto-Ireland 2002: Optics and Photonics Technologies and Applicantions, Proceedings of the SPIE, vol. 4876, (2003), p. 470-478.*

* cited by examiner

METHOD OF AN ULTRA-SHORT FEMTOSECOND PULSE AND KW CLASS HIGH AVERAGE-POWER LASER FOR PREVENTING COLD-WORKED STRESS CORROSION CRACKING IN IRON STEELS AND ALLOYED STEELS INCLUDING STAINLESS STEELS

BACKGROUND OF THE INVENTION

This invention relates to a method of preventing cold-worked stress corrosion cracking in virtually all types of iron steels and alloyed steels including stainless steels (hereinafter, iron steels having low contents of impurity elements and alloyed steels having comparatively high contents of alloying elements are collectively referred to as "iron steels and alloyed steels"). The method comprises removing a residual tensile stressed layer, optionally generating residual compression, through the impact of irradiation with an ultra-short femtosecond pulse and kW class high average-power laser, and removing a hardened surface layer extremely susceptible to stress corrosion cracking, whereby this susceptible hardened surface layer with concentrated dislocation defects and the like is removed without generating or introducing any of such hardened layer in the process of its removal.

If iron steels and alloyed steels are cold-worked, and then are under in corrosive environments, cold-worked stress corrosion cracking occurs in its surface, as shown in FIG. 1, in which numeral 1 refers to the iron steels and alloyed steels including stainless steels as the object under corrosive environments, 2 the corrosive environments, 3 the developed residual tensile stress, 4 the susceptible, hardened surface layer which is prone to cold-worked stress corrosion cracking, and 5 the stress corrosion cracking in an advanced state.

Some knowledge has been obtained about the conditions under which cold-worked stress corrosion cracking occurs but no detailed understanding has been obtained for the mechanism by which a specific type of cracking occurs and develops. A current approach of the prevention usually relies upon retarding the chemical reaction rate of corrosion to adopt severe and strict guidelines of the corrosive environments and to control the pH of cooling water, water condensed on surfaces, and the likes.

Another current approach depends on annealing, in which the temperature of all or part of the objects are elevated so that residual tensile stress is substantially eliminated. However, this method is not applicable to specially-processed steel sections that have been forged, rolled or otherwise worked to have higher tensile strength because the required strength can not be kept after the annealing.

In another approach, selected or all surfaces of the work are impacted by steel balls or shaped-shots which are projected at high speed in a generally vertical direction and by the resulting compressive force, the residual tensile stress on the horizontal surface is converted to residual compression.

In another approach, high-power laser light is applied to selected or all surfaces of the work in water in a generally vertical direction so that they are impacted by the extinguishing pulse pressure of bubbles that form on the surface, and by the resulting compressive force, the residual tensile stress on the horizontal surface is converted to residual compression.

In another approach, a high-speed water jet is propelled to selected or all surfaces of the work in water in a generally vertical direction so that they are impacted by the extinguishing pulse pressure of the cavitation that develops on the surface, and by the resulting compressive force, the residual tensile stress on the horizontal surface is converted to residual compression.

In another approach, a hardened surface layer is roughly removed from a selected area or all areas of the work by means of an abrasive such as diamond powder, sand particle and others with the ground area or areas and the surrounding areas being cooled to ensure that no heat generation occurs or no additional hardened layer will form, and the remaining hardened layer is etched away in an acidic solution with or without an applied electric field. If desired, either the grinding step or the etching step alone may be performed. However, it is difficult to achieve uniform processing by this method since the grain boundaries in the work are etched irregularly in larger area.

Another method takes an entirely different approach and manufactures a work from a specially designed material such as low-carbon stainless steel which has been rendered less sensitive to stress corrosion cracking in that stress corrosion cracking will not easily develop or progress.

These methods that are intended to prevent cold-worked or otherwise induced stress corrosion cracking have some field-proven records; however, the type of work that can be processed, the place where processing can be done, the shape of the work, and other conditions are so rigorous that the future and current applicability of the methods is fairly limited and their effectiveness and effective periods are also limited to cause the following problems.

Ever since the beginning of recorded history, cold-worked stress corrosion cracking has put considerable limit on the performing functions and serviceable periods of many tools, machines, vehicles and structural parts made of the iron steels and alloyed steels including stainless steels, and on account the difficulty in predicting it, cold-worked stress corrosion cracking has been a cause of many cracking accidents.

Even today, cold-worked stress corrosion cracking contributes to markedly increasing the production and maintenance costs of many nuclear reactors, power plants, production facilities in heavy chemical industries, bridges, buildings made of the iron steels and alloyed steels including stainless steels, aircrafts, automobiles, railways and all other structures made from the iron steels and alloyed steels including stainless steels. Since cold-worked stress corrosion cracking limits the performance and functions and serviceability periods of those structures and the timing of cracking is difficult to predict, this type of cracking has been a cause of many accidents.

Environmental factors such as the water content and the corrosive ingredients in water have been dealt with by pH control and other methods; however, not all of them can be controlled by manufacturing technologies and there is a need to solve the problem of cold-worked stress corrosion cracking by developing an ideal manufacturing technology which, even in the presence of some environmental factors, can control the other two conditions so as to overcome the horrible environments.

The approach that relies upon retarding the development of corrosion by adopting strict guidelines for corrosive environments as for the pH of water and concentration of the chlorine ingredient in it is not usually applicable at all times. Depending on the conditions of the apparatus, the method is not usually applicable in many cases.

The approach which performs annealing to elevate the temperature of all or part of the work so that residual tensile stress is substantially eliminated throughout the work ranging from the surfaces to the interior is difficult to apply to large or complex shapes; it is not applicable at all if the object has thermally vulnerable parts or areas; it is also difficult to apply on-site to parts or apparatuses that require high rigidity or strength. Thus, the approach under consideration cannot always be adopted and more often than not it is generally unsuitable for use.

The approach in which selected or all surfaces of the work are impacted by steel balls or other shaped shots which are projected at high speed in a generally vertical direction and by the resulting compressive force, the residual tensile stress on the horizontal surface is converted to residual compression, is not applicable in all cases and the effect lasts for only a short peroid, thus requiring repeated processing. In addition, it often occurs that interference by nearby equipment precludes application of the approach. As a further problem, scattering steel balls or other shaped shots often impairs the integrity of equipment, making the approach unsuitable for use in circumstances where they are difficult to recover.

The approach in which high-power laser light is applied to selected or all surfaces of the work in water in a generally vertical direction so that they are impacted by the extinguishing pulse pressure of bubbles that form on the surface, and by the resulting compressive force, the residual tensile stress on the horizontal surface is converted to residual compression, is difficult to apply to very large structures, miniature structures and complex shapes; it is impossible to apply if the work has parts or areas that cannot be put into water; it is also difficult to apply in places that dislike the use of water. Thus, the approach under consideration cannot always be adopted and more often than not it is generally unsuitable for use.

The approach in which a high-speed water jet is propelled to selected or all surfaces of the work in water in a generally vertical direction so that they are impacted by the extinguishing pulse pressure of the cavitation that develops on the surface, and by the resulting compressive force, the residual tensile stress on the horizontal surface is converted to residual compression, is difficult to apply to very large structures, miniature structures and complex shapes; it is impossible to apply if the work has parts or areas that cannot be put into water; it is also difficult to apply in places that dislike the use of water. Thus, the approach under consideration cannot always be adopted and more often than not it is generally unsuitable for use.

The approach to be considered next is one in which a hardened surface layer is roughly removed from a selected area or all areas of the work by means of an abrasive such as diamond powder, sand particle and others with the ground area or areas and the surrounding areas being cooled to ensure that no heat generation occurs or no additional hardened layer will form, and the remaining hardened layer is etched away in an acidic solution with or without an applied electric field. If desired, either the grinding step or the etching step alone may be performed. However, these methods are difficult to apply to very large structures, miniature structures and complex shapes; they cannot be applied if the object has parts or areas that are vulnerable to acidic corrosive chemicals; they are also difficult to apply on-site. Thus, the methods under consideration cannot always be adopted and more often than not they are generally unsuitable for use.

Speaking of the method which manufactures a work from a specially designed material such as one in which stress corrosion cracking will not easily develop, or one which has been rendered less sensitive to stress corrosion cracking, or one in which stress corrosion cracking will not easily develop, no such materials have been developed and many iron steels and alloyed steels including stainless steels still remain unsuitable for use, so it is impossible to apply the method in almost all cases. The few developed, new materials are so expensive that the method is not applicable in all cases for economic and other reasons. More often than not the method is generally unsuitable for use.

SUMMARY OF THE INVENTION

The purpose, therefore, of the present invention is to provide a method of preventing cold-worked stress corrosion cracking that is free from the risk of damaging other equipment by steel balls or other shaped shots, which is almost unlimited in use environment, effectiveness, work, place and other conditions for application, that is inexpensive, and which functions continuously for a much longer period than an ordinary nuclear reactor's service life.

In the method of the present invention for preventing cold-worked stress corrosion cracking, the impact of irradiation with an ultra-short femtosecond pulse and kW class high average-power laser is employed to ensure that surface layers of almost all kinds of the iron steels and alloyed steels including stainless steels where residual tensile stress is present are removed by a non-thermal, non-equivalent evaporation to occur faster than heat conduction while at the same time, the tensile stress is reduced, with optional generation of residual compression, by the impact pressure of the laser so as to eliminate the development of cracking and, in addition, a hardened surface layer with concentrated dislocation defects and the likes which is extremely susceptible to cold-worked stress corrosion cracking is removed by non-thermal, non-equivalent evaporation without allowing any new hardened layer to form.

The term "non-thermal" as used herein refers to such a situation that on account of the extremely short duration of laser pulses, the substance at the irradiated site evaporates faster than heat transfers to the surrounding areas, thus preventing heat transfer to the surrounding substance; the term "non-equilibrium" as used herein refers to such a situation that for the same reason that laser pulses have an extremely short duration, the substance at the irradiated site evaporates before thermal equilibrium is reached.

DETAILED DESCRIPTION OF THE INVENTION

Figure 1:
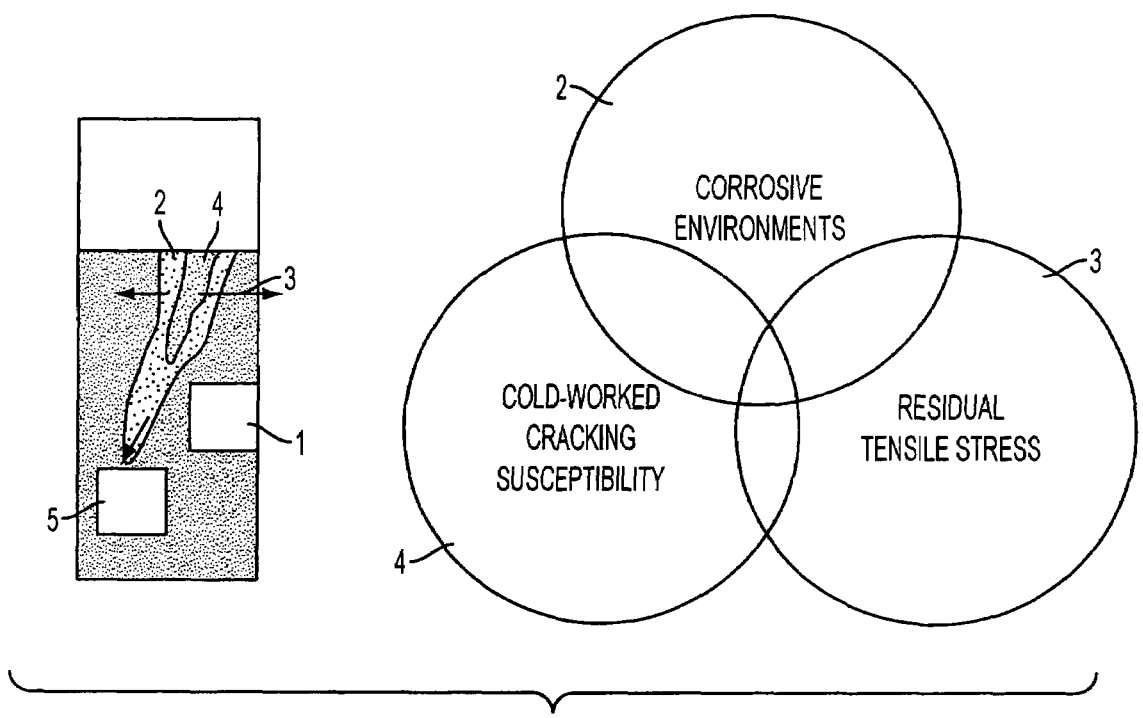
FIG. 1 shows the conditions for the occurrence of cold-worked stress corrosion cracking.
Figure 2:
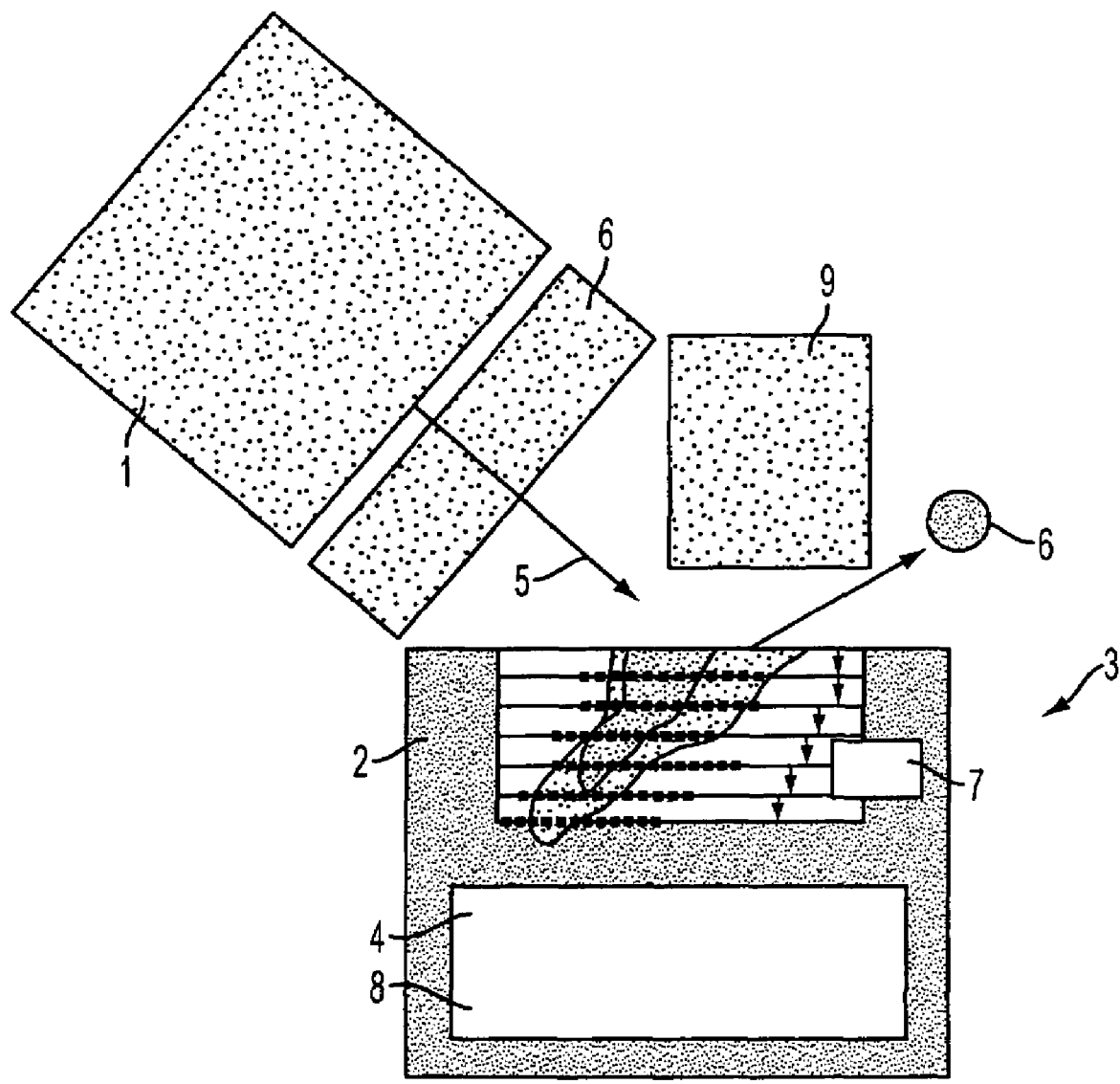
FIG. 2 shows how cold-worked stress corrosion cracking can be prevented by the method of the present invention.

A superconducting linac-based free-electron laser apparatus which is the only ultra-short femtosecond pulse and kW class high average-power laser that can output an average power in the highest kilowatt class or more is employed to perform irradiation as shown in FIG. 2, thereby preventing cold-worked stress corrosion cracking.

FIG. 2 shows the method of preventing cold-worked stress corrosion cracking in which the iron steels and alloyed steels including stainless steels are irradiated with the ultra-short femtosecond pulse and kW class high average-power laser so that a hardened surface layer of the work which is extremely susceptible to cold-worked stress corrosion cracking and a surface layer which has residual tensile stress contributing to the development of cracking are both removed by non-thermal, non-equilibrium evaporation which occurs faster than heat conduction and, by additional impact pressure of laser, a residual compression sufficient to cancel the residual tensile stress is generated on those surfaces, thereby preventing cold-worked stress corrosion cracking. In FIG. 2, numeral 1 refers to the femtosecond range, ultra-short pulsed, kW class, high average power laser, numeral 2 the surface of the iron steels and alloyed steels including stainless steels as the work, which is a crack-susceptible, cold-worked site and a surface layer having residual tensile stress, numeral 3 the corrosive environment, 4 the development of cold-worked stress corrosion racking, 5 a highly crack-sensitive, hardened surface layer which is prone to cold-worked stress corrosion cracking, 6 a surface observing device, 7 the surface layer to be removed by non-thermal, non-equilibrium evaporation, 8 the residual compression generated by laser irradiation, and 9 a detector of cold-worked surface defects.

For removal by non-thermal, non-equilibrium evaporation, it must be ensured that the surface temperature of the object will not elevate and to this end, laser light is applied to scan quickly at a large number of irradiated spots over a large number of times. Alternatively, a number of laser beams are simultaneously scanned to irradiate and to remove non-thermally on the object.

In the present invention, laser light is applied not normal to the surface to be peeled off but at a small enough angle to be called nearly horizontally so that the substance peeled off will recoil in a direction greatly different from the incidence of laser light; as a result, the residue that is peeled off by the laser irradiation is automatically allowed to recoil for removal with ease and the hot recoiling residue will not deposit around the irradiated surface.

In order to ensure that the relatively hot residue or irradiated surface will not react with the oxygen in air to generate intense heat, a jet of an inert gas such as a rare gas is applied so that the air is blocked and isolated from the irradiated surface to prevent an increase in temperature while at the same time the residue is blown off to be removed at high speed from the irradiated surface by the gas jet.

In order to facilitate irradiation and gas isolation, the gas flow is made coaxial with and concurrent to the application of laser light. In addition, in order to avoid a stagnant gas flow, the surface being irradiated, the laser apparatus, the gas ejection hole, and the likes as a whole are insulated and isolated by means of a container, a barrier gas jet, or the likes.

If desired, a gas jet may be expanded adiabatically and propelled as a liquefied mist, or alternatively, it may be mixed with a different kind of liquid mist; in either way, one can realize not only propulsion that permits for removal of the residue at ultrasonic or high speed but they can also cool the irradiated surface as it is effectively insulated from the air.

As described above, according to the present invention, two primary causes of cold-worked stress corrosion cracking other than corrosive environmental factors can be eliminated simultaneously although this has been impossible with the prior art. In short, both a hardened surface layer of a work where stress corrosion cracking starts to develop and a surface layer involving residual tensile stress which induces stress corrosion cracking to develop to a larger and deeper area are removed by non-thermal, non-equilibrium evaporation at faster speed than heat conduction using the ultra-short femtosecond pulse and kW class high average-power laser, and residual compression which is extremely effective in preventing cold-worked stress corrosion cracking is optionally generated by the impact pressure of laser light.

The method of the present invention can be easily implemented using nothing like steel balls or other shaped shots, water, acidic corrosive solutions, heat sources, and abrasive shot.

The method of the present invention is in no way limited in terms of the weight and shape of the object and the processing site; hence, it can be executed easily and at low cost over a large area.

The method of the present invention is applicable to all articles and structures made of the iron steels and alloyed steels including stainless steels that are prone to cold-worked stress corrosion cracking. Not only prior to cold working, the method is also applicable to already fabricated internal structures, machines, parts, etc. in nuclear reactors during maintenance, inspection or service, and it can be performed easily and at low cost.

What is claimed is:

1. A method of preventing cold-worked stress corrosion cracking on a surface of iron steels or alloyed steels including stainless steels, the method comprising:

irradiating an ultra-short femtosecond pulse from a kW class high average-powder laser light to the iron steels or alloyed steels including stainless steels to remove a surface layer and a hardened surface of the iron steels or alloyed steels, wherein an areal density of irradiated energy per pulse is less than 1 J/cm$^2$; and applying an ultrasonic gas jet containing a liquid mist of at least one of water, solution, liquid compound or liquefied gas, coaxially with the laser light, and concurrent to the irradiating, while the surface layer is being removed, measuring residual tensile stress of the surface layer using a quantum interference device, or a Hall effect magnetic filed measuring device, and monitoring the surface layer using an electron microscope, to confirm the removal of the surface layer and the hardened surface layer after the irradiating.

* * * * *

UNITED STATES PATENT AND TRADEMARK OFFICE
CERTIFICATE OF CORRECTION

PATENT NO. : 7,651,576 B2
APPLICATION NO. : 11/214044
DATED : January 26, 2010
INVENTOR(S) : Eisuke Minehara et al.

It is certified that error appears in the above-identified patent and that said Letters Patent is hereby corrected as shown below:

Column 6, Line 33, change "average-powder" to --average-power--.

Column 6, Line 41, change "irradiating," to --irradiating;--.

Column 6, Line 44, change "device," to --device--.

Column 6, Line 44, change "filed" to --field--.

Signed and Sealed this

First Day of June, 2010

David J. Kappos
*Director of the United States Patent and Trademark Office*